June 9, 1953　　　D. P. WRIGHT ET AL　　　2,641,503
DUPLEX SPRAY MACHINE

Filed March 27, 1950　　　　　　　　2 Sheets-Sheet 1

INVENTORS
David P. Wright
Richard H. Fish

BY *[signature]*
ATTORNEYS

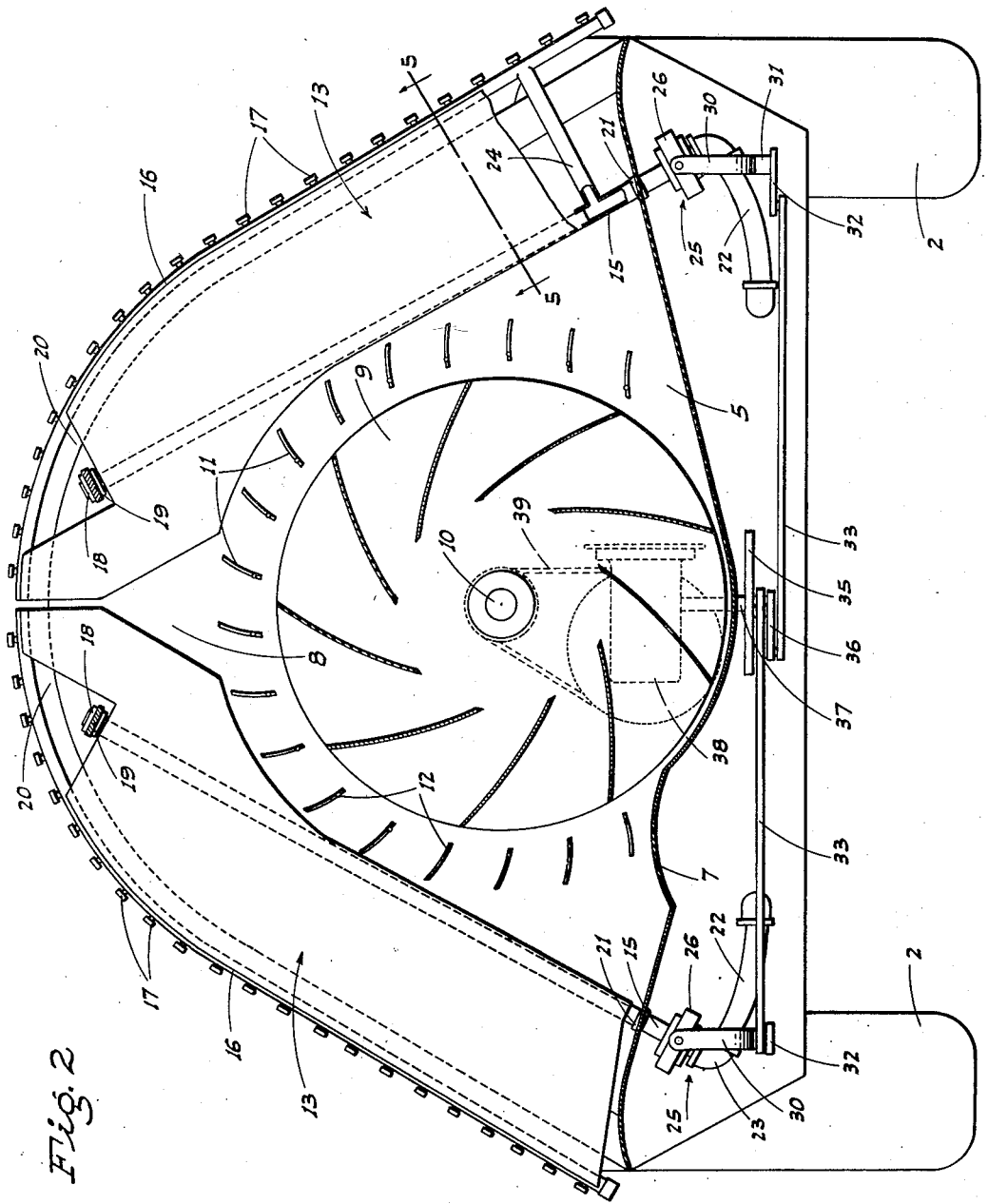

Patented June 9, 1953

2,641,503

UNITED STATES PATENT OFFICE 2,641,503

DUPLEX SPRAY MACHINE

David Porter Wright, Oakland, and Richard Harrison Fish, Morgan Hill, Calif., assignors to Air-O Fan Products Corporation, Gilroy, Calif., a corporation of California Application March 27, 1950, Serial No. 152,142

4 Claims. (Cl. 299—37)

This invention relates generally to a power driven sprayer for agricultural use, especially the spraying of orchard trees with pest or disease control solutions.

An important object of the instant invention is to provide a machine, for the purpose described, wherein the air-spray blast is caused to emit from the machine, laterally and upwardly, with a pulsating and sweeping action so that an adjacent tree is effectively sprayed without leaving blind spots; i. e. skipping certain tree areas.

Another object of this invention is to provide a spray machine, as in the preceding paragraph, wherein such pulsating and sweeping action is accomplished through the use of an oscillating deflection vane extending to each air blast outlet of the machine; there being a novel mechanism for power oscillating each vane.

A further object of the invention is to provide a spray machine which produces very effective atomization of the liquid spray and directional control thereof; this being obtained by mounting the spray nozzles along the outer edge of each oscillating deflection vane, and feeding said nozzles from within said vane. With such arrangement, the nozzles always discharge into the sweeping air blast in its direction of flow.

An additional object of the invention is to provide a spray machine which is operative to discharge an air-spray blast laterally outwardly and upwardly from each side of the machine whereby to spray the trees of adjacent rows between which said machine travels.

It is also an object of the invention to provide a spray machine which is designed for ready and convenient manufacture.

Still another object of the invention is to provide a practical and reliable device, and one which will be exceedingly effective for the purpose for which it is designed.

These objects are accomplished by means of such structure and relative arrangement of parts as will fully appear by a perusal of the following specification and claims.

In the drawings:

Fig. 2 is an enlarged transverse section taken through the spray unit.

Figure 1:
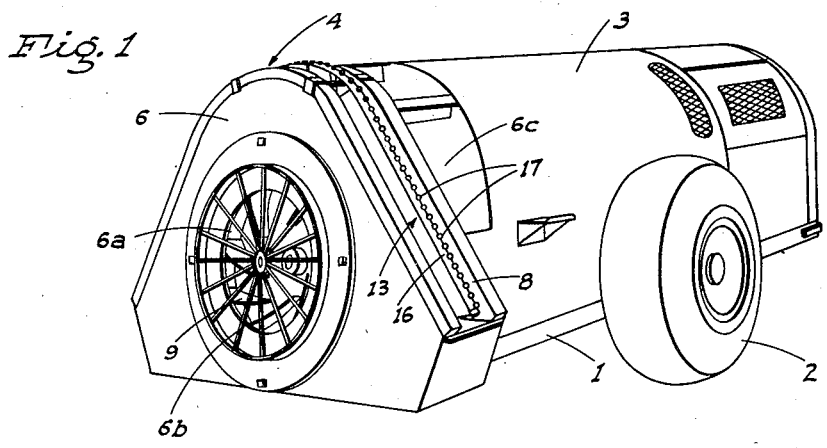
Fig. 1 is a perspective view of a spray machine embodying the present invention.
Figure 3:
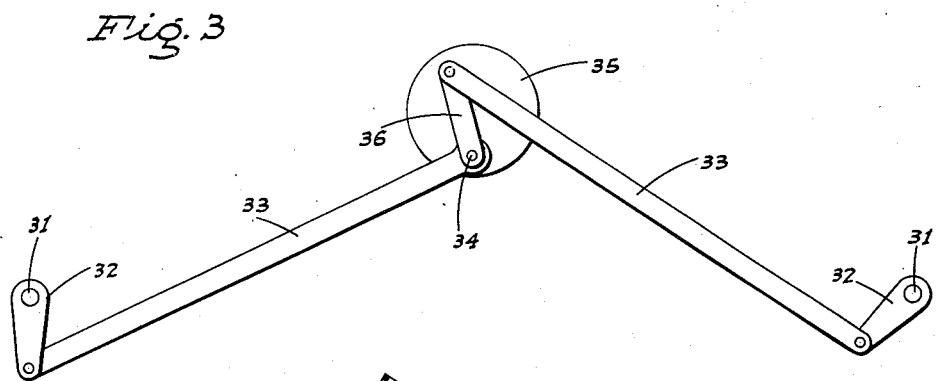
Fig. 3 is a bottom plan view of the mechanism employed to oscillate the vanes.
Figure 4:
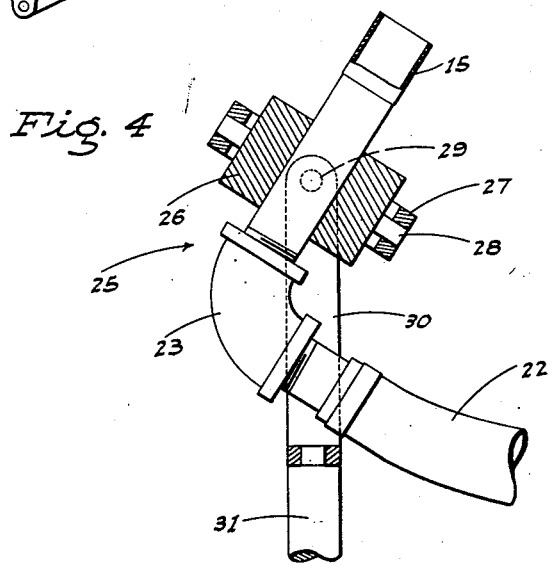
Fig. 4 is an enlarged, fragmentary, sectional elevation of one of the swivel connections used at the lower ends of the vanes.
Figure 5:
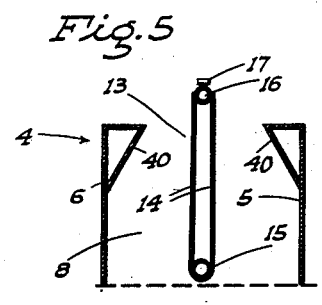
Fig. 5 is a fragmentary cross section on line 5—5 of Fig. 2.

Referring now more particularly to the characters of reference on the drawings, the machine is of trailer type, adapted to be coupled in draft relation to a tractor; the numeral 1 indicating generally the trailer frame, which is supported on opposite sides by pneumatic tire wheels 2.

An elongated housing 3 is mounted on the frame 1 and encloses, as is usual in machines of the general type, an engine and a liquid spray tank (neither being shown).

At the rear end of the housing 3 the machine is provided with the spray unit—in which the invention is embodied—comprising the following:

The numeral 4 indicates an upstanding, transversely extending fan casing of semi-triangular configuration in end elevation.

The fan casing 4 is rigidly mounted in connection with the rear end of the frame 1, and includes a front shroud or wall 5, a rear shroud or wall 6 spaced from the wall 5, and a connecting bottom plate 7.

The front and rear walls 5 and 6 respectively of the fan casing are formed with circular air intake openings; the opening in the rear wall being shown at 6a, and said opening normally being covered by a grille-like guard 6b. The air intake opening in the front wall 5 is not shown, but is fed from an opening 6c in the housing 3.

The fan casing is formed, on opposite sides, with air blast outlet slots 8, which slots extend, from opposite ends of the bottom plate 7, in upwardly and inwardly converging relation to the top of the fan casing 4, and at which point said slots merge. In other words, the slots 8 form a continuous opening about the sides and top of said fan casing.

Laterally inwardly of the slots 8, and centrally in the fan casing 4, registering with the air intake openings in the walls thereof, there is disposed a centrifugal discharge fan 9 mounted on a longitudinal shaft 10 which projects into the fan casing 4 from ahead thereof; i. e. from within the housing 3, and in which the engine (not shown) drives such shaft.

As so mounted the centrifugal discharge fan 9 is operative to deliver a very powerful air blast out of the slots 8 in a lateral, as well as upward, direction.

Proper directional distribution of the air blast from the fan 9 through the slots 8 is accomplished by a circumferential row of relatively small, equally spaced, deflector vanes 11 which span between the front and rear walls 5 and 6, respectively, of the fan casing 4. These deflector vanes 11 are supported by spindles 12 whereby the vanes may be adjusted to the best working position.

An oscillating, air blast deflection vane, indicated generally at 13, is mounted centrally in each slot 8 and extends full length thereof; each such vane being relatively thin transversely of the direction of air blast but relatively wide in said direction. Each vane 13 includes side plates 14 secured at the inner edge to a tubular shaft 15, and secured at the outer edge to a pipe 16; the latter curving inwardly at the upper end of the corresponding vane to a termination close to the adjacent end of the outer edge pipe 16 of the other vane 13.

A multiplicity of outwardly projecting nozzles 17 are mounted in communicating relation on, and extend as a row the full length of, each outer edge pipe 16.

Each vane 13 is disposed in the corresponding slot 8 so that it projects only slightly out of, and is mounted for lateral oscillation in, such slot as follows:

At the upper end the tubular shaft 15 of each vane 13 is journaled, as at 18, in connection with a cross bar 19 which extends between the walls 5 and 6; the vane being notched, as at 20, to permit of such mounting.

Adjacent, but short of, its lower end the tubular shaft 15 of each vane 13 is journaled, as at 21, in connection with the bottom plate 7; such shaft projecting a short distance below such bottom plate.

Liquid spray material is fed to the nozzles 17 from the tank (not shown) within the housing 3 by passage means which includes a flexible conduit 22 leading to adjacent the lower end of each tubular shaft 15, and being connected to the latter by an elbow fitting 23. After being fed into each tubular shaft 15 the liquid-spray material delivers through a lateral pipe 24 into the corresponding outer edge pipe 16, and thence sprays from the nozzles 17; such liquid-spray material being delivered under pressure.

The vanes 13 are oscillated, in opposition, whereby on each side of the machine the air-spray blast emits with a pulsating and sweeping action; such oscillation of the vanes being accomplished by means of the following mechanism:

Each tubular shaft 15 is secured to a universal coupling, indicated generally at 25, which comprises a collar 26 on the shaft, a ring 27 surrounding the collar 26, opposed pivots 28 between said ring and collar, and other opposed pivots 29 which project laterally outwardly from the ring 27 at right angles to the pivots 28. The opposed pivots 29 are secured to the upper ends of a yoke 30 which straddles the elbow fitting 23 from below; such yoke 30 including a depending stem 31.

The depending stem 31 of each universal coupling 25 has a radial lever arm 32 affixed thereon, and pivotally connected links 33 extend laterally inwardly from the radial lever arms 32. At their inner ends one of the links 33 is direct-connected to a crank pin 34 of a crank disc 35, while the other link 33 is connected to said crank pin by means of a radial extension lever 36 thereon. With this arrangement the links 33 are connected in eccentric relation to the crank disc 35, but are worked in opposition by said disc. The result is that the radial lever arms 32 and the vanes 13 are oscillated in opposition relative to each other.

The crank disc 35 which is disposed in a plane below the bottom plate 7 and slightly ahead of the fan casing 4 is fixed on the lower end of a vertical shaft 37 which depends from a reduction gear box 38 driven by an endless belt and pulley unit 39 from the shaft 10 ahead of the centrifugal discharge fan 9.

With the foregoing mechanism the vanes 13 are constantly oscillated, in opposition to each other, in their respective slots 8, and with such oscillation of the vanes the air-spray blast emits from the machine laterally and upwardly on opposite sides with a pulsating and sweeping action. The result is that the air-spray blast drives into each tree much more effectively than otherwise, assuring against leaving spots or areas in the trees untreated. The pulsating and sweeping action of the air spray causes the leaves of the trees to flutter to an extent that most effective coverage of such leaves and the twigs is accomplished as the machine passes.

Being duplex, i. e. delivering from opposite sides, the machine is operative to spray the trees of adjacent rows between which such machine travels, and any branches which overhang the machine are treated from the nozzles which occupy the inwardly curved upper portions of the outer edge pipes 16 of the vanes 13.

The vanes 13 may oscillate, while at the same time being supplied with the liquid-spray material under pressure, by reason of the fact that the conduit portions 22 are flexible, and flex as the tubular shafts 15 are rocked through the medium of the universal couplings 25.

The air blast out of the slots 8 is increased in velocity by reducing the width of each slot at the mouth thereof, as at 40; this reduction in width being termed "coning in." With such coning in the velocity of the air blast out of the corresponding slot is increased for maximum efficiency, and additionally the air blast is caused to deliver close along the sides of the vanes 13 in most effective spray pick-up relation to the nozzles 17.

Additionally, as the nozzles 17 are mounted on, and project from, the outer edge of each vane, such nozzles discharge at all times in the direction of the air blast, regardless of the oscillatory position of the vane; this being important to the attainment of very effective atomization of the spray and its directional control.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. An agricultural spray machine comprising a fan casing having an upwardly extending, laterally opening air blast outlet slot therein, a power driven fan in the casing operative to create an air blast through the slot, an air blast deflection vane extending lengthwise in the slot, means pivoting the vane in the slot for oscillation across the air blast and about a longitudinal axis extending along the inner edge portion of said vane, a power actuated crank mechanism, connections between the crank mechanism and vane operative to oscillate the latter, a pipe along the outer longitudinal edge of the vane, a row of nozzles on the pipe, the vane mounting means including a tubular shaft along the inner edge of the vane, a conduit communicating between the pipe and tubular shaft, a flexible conduit to supply spray, and a coupling between said flexible conduit and tubular shaft; said connections, for oscillating the vane, including a part attached to the tubular shaft in working relation thereto.

2. An agricultural spray machine comprising a fan casing having an upwardly extending, laterally opening air blast outlet slot therein, a power driven fan in the casing operative to create an air blast through the slot, an air blast deflection vane extending lengthwise in the slot, means pivotally mounting the vane in the slot for oscillation across the air blast and about a longitudinal axis extending along the inner edge of the vane, said mounting means including a shaft projecting from one end of the vane, a universal coupling attached to the shaft, a power actuated crank mechanism spaced from the universal coupling, connections between the crank mechanism and universal coupling to oscillate the shaft and vane from said mechanism, the shaft being tubular, a flexible, spray supply conduit coupled to the shaft, a pipe along the outer edge of the vane in communication with the tubular shaft, and a row of outwardly projecting nozzles on the pipe.

3. An agricultural spray machine comprising a fan casing having an elongated air blast outlet slot, a power driven fan operative to create an air blast outwardly of said slot, an elongated substantially flat vane pivotally mounted in the casing inwardly adjacent to the slot and longitudinally thereof and transversely edgewardly extended through the slot, a power actuated crank mechanism, connections between the crank mechanism and the vane operative to oscillate the vane in the slot, a plurality of nozzles mounted on the edge of the vane extended through the slot and directed outwardly of the slot in substantial alignment with the vane, and means for supplying fluid spray material under pressure to the nozzles.

4. An agricultural spray machine comprising a fan casing, said casing having a pair of elongated air blast outlet slots therein upwardly and oppositely laterally disposed therefrom, an elongated substantially flat vane positioned longitudinally in each slot and transversely edgewardly extended therethrough providing an edge within the casing and an edge externally of the casing, means pivotally mounting the inner edge of each vane within the casing for oscillation about an axis longitudinally of its respective slot, said mounting means including a hollow shaft projecting from corresponding ends of each of the vanes, a pipe mounted along the outer edge of each vane, means interconnecting the pipe and the hollow shaft in fluid communication, a plurality of nozzles mounted on the pipe and outwardly extended therefrom relative to the casing in substantial alignment with the vane on which their respective pipe is mounted, a universal coupling attached to each of the shafts, a lever arm extended from each universal coupling generally transversely from its coupling's respective shaft, a power actuated crank disc rotatably mounted intermediate the lever arms, links having outer ends individually connected to the lever arms and inner ends diametrically oppositely eccentrically connected to the disc, and a flexible spray supply conduit coupled to each shaft.

DAVID PORTER WRIGHT.
RICHARD HARRISON FISH.

References Cited in the file of this patent

UNITED STATES PATENTS

| Number | Name | Date |
|---|---|---|
| 1,859,567 | Knapp et al. | May 24, 1932 |
| 2,321,792 | Bowie | June 15, 1943 |
| 2,374,130 | Planiol | Apr. 17, 1945 |
| 2,429,374 | Shade | Oct. 21, 1947 |
| 2,454,339 | Potts et al. | Nov. 23, 1948 |
| 2,583,753 | Spreng et al. | Jan. 29, 1952 |

FOREIGN PATENTS

| Number | Country | Date |
|---|---|---|
| 588,592 | Great Britain | May 28, 1947 |